US009429218B2

(12) United States Patent
Wu (10) Patent No.: US 9,429,218 B2
(45) Date of Patent: Aug. 30, 2016

(54) ACTUATOR HAVING BUFFER STRUCTURE (71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 267 days.

(21) Appl. No.: 13/937,095

(22) Filed: Jul. 8, 2013

(65) Prior Publication Data

US 2014/0326089 A1  Nov. 6, 2014

(30) Foreign Application Priority Data

May 3, 2013 (TW) .............................. 102116004 A (51) Int. Cl.
*F16H 25/20* (2006.01)

(52) U.S. Cl.
CPC .......... *F16H 25/20* (2013.01); *F16H 25/2021* (2013.01); *F16H 2025/209* (2013.01); *F16H 2025/2068* (2013.01); *F16H 2025/2071* (2013.01); *F16H 2025/2084* (2013.01); *Y10T 74/18576* (2015.01)

(58) Field of Classification Search
CPC ............... F16H 25/20; F16H 25/2025; F16H 2025/2065; F16H 2025/2068; F16H 2025/2071; F16H 2025/2463; F16H 2025/209; F16H 2025/2084; A61G 7/1069
USPC .................. 74/89.39, 89.38, 89.26
See application file for complete search history.

(56) References Cited

U.S. PATENT DOCUMENTS

| 2,070,365 | A | * | 2/1937 | Leventis et al. | ............... 188/162 |
| 2,459,982 | A | | 1/1949 | Wells | |
| 3,640,141 | A | * | 2/1972 | Hollingsead et al. | ........ 74/89.38 |
| 3,659,683 | A | * | 5/1972 | Betzing | .......................... 188/162 |
| 4,347,885 | A | * | 9/1982 | von Knorring et al. | ....... 160/242 |
| 5,306,248 | A | * | 4/1994 | Barrington | .................. 604/97.02 |

(Continued)

FOREIGN PATENT DOCUMENTS

| DE | 29606367 U1 | 8/1996 |
| DE | 202006009957 U1 | 11/2006 |

(Continued)

OTHER PUBLICATIONS

German Examination Report issued on Feb. 25, 2014.
1st OA dated Feb. 10, 2015 of the corresponding TW patent application No. 102116004.

*Primary Examiner* — William Kelleher
*Assistant Examiner* — Gregory Prather
(74) *Attorney, Agent, or Firm* — Chun-Ming Shih; HDLS IPR Services (57) ABSTRACT

An actuator includes a drive screw (32), an external tube (34), a stretchable tube (35), and a buffer structure (50). The external tube (34) is sleeved around the drive screw (32) externally. The stretchable tube (35) is passed through and connected to the external tube (34), wherein the stretchable tube (35) has a nut (351) screwed to and driven by the drive screw (32). The buffer structure (50) comprises a positioning member (51) and a buffer unit (52). The positioning member (51) is fixed to the drive screw (32). The buffer unit (52) is sleeved around the drive screw (32) and between the nut (351) and the positioning member (51). Therefore, the impact force generated during the fast falling of the stretchable tube (35) can be absorbed.

16 Claims, 7 Drawing Sheets

(56) References Cited

U.S. PATENT DOCUMENTS

| | | | |
|---|---|---|---|
| 5,865,272 A * | 2/1999 | Wiggins et al. | 185/40 R |
| 7,396,202 B1 * | 7/2008 | Panzarella et al. | 414/542 |
| 2003/0015047 A1 * | 1/2003 | Rogers, Jr. | F16H 25/20 74/89.25 |
| 2011/0060336 A1 * | 3/2011 | Pool et al. | 606/57 |
| 2014/0202271 A1 * | 7/2014 | Oberndorfer | 74/89.37 |
| 2014/0311265 A1 * | 10/2014 | Duck et al. | 74/89.23 |
| 2015/0135865 A1 * | 5/2015 | Oberndorfer | 74/89.14 |

FOREIGN PATENT DOCUMENTS

| | | |
|---|---|---|
| DE | 202007001797 U1 | 4/2007 |
| DE | 202013101333 U1 | 4/2013 |
| JP | 2012147656 A | 8/2012 |
| TW | M460961 U1 | 9/2013 |

* cited by examiner

ACTUATOR HAVING BUFFER STRUCTURE

BACKGROUND OF THE INVENTION

1. Field of the Invention

The present invention relates to an actuator and in particular to an actuator having a buffer structure.

2. Description of Related Art

The actuators have been commonly used in automatic hospital beds, treadmills, and wheelchairs for adjusting the position and elevation thereof. In particular, during the first aid treatment for patients, the use of a fast mechanism for releasing the actuator fast can adjust the hospital bed to obtain the most precious rescue time. However, during the fast release of the actuator, the impact force caused by fast falling may injure the patient. Therefore, how to provide a buffer function before the end of the fast falling becomes an important topic associated with the present invention.

The traditional actuator comprises an electric motor, a transmission mechanism, and a fast release mechanism. The electric motor has a worm shaft. The transmission mechanism comprises a drive screw and a worm gear sleeved around the drive screw and engaged with the worm shaft. The fast release mechanism comprises two cylindrical connecting parts; one is fixed to and rotated with the drive screw; the other is fixed to and rotated with the worm gear. A torque transmission member is disposed at each corresponding end of the cylindrical connecting parts. By means of the clutch between the two cylindrical connecting parts, the drive screw and the worm gear can rotate together or separately.

However, the traditional actuator in operation presents the following problems. Without the structure of the buffer mechanism, the impact force caused by fast falling may injure the patient during the fast release of the actuator. To solve this problem, a pneumatic cylinder is usually installed beside the actuator to provide a buffer function. However, the addition of the pneumatic cylinder will make the hospital bed a more complex structure and increase the manufacturing cost. The present invention provides such an actuator having a buffer structure without the additional pneumatic cylinder, which makes the hospital bed simple and decreases the manufacturing cost.

SUMMARY OF THE INVENTION

One objective of the present invention is to provide an actuator having a buffer structure, which can absorbs the impact force caused by fast falling of the stretchable tube by means of the configured relationship of a buffer unit, a drive screw, and a nut.

To achieve the above objective, the present invention provides an actuator having a buffer structure. The actuator comprises a drive screw, an external tube, a stretchable tube, and a buffer structure. The external tube is sleeved around the drive screw externally. The stretchable tube is passed through and connected to the external tube. The stretchable tube has a nut screwed to and driven by the drive screw. The buffer structure comprises a positioning member and a buffer unit. The positioning member is fixed to the drive screw. The buffer unit is sleeved around the drive screw and between the nut and the positioning member.

To achieve the above objective, the present invention further provides an actuator having a buffer structure. The actuator comprises a drive screw, a nut, and a buffer structure. The nut is screwed to the drive screw and is confined to move axially with respect to the drive screw. The buffer structure comprises a buffer unit sleeved around the perimeter of the drive screw and disposed on a side of the drive screw along which the nut moves.

The present invention also has the following effects. The fixing of the positioning member to the drive screw can effectively avoid the damage to each surrounding component or mechanism after the buffer unit withstands the impact. Also, the buffer unit can be properly disposed in place by means of the disposition of each connecting ring and coupling portion.

DETAILED DESCRIPTION OF THE INVENTION

The detailed explanation and technique of the present invention will be described with accompanying figures as follows. However, the accompanying figures are only for reference and explanation, not to limit the scope of the present invention.

As shown in FIGS. 1-5, the present invention provides an actuator having a buffer structure. The embodiment uses an actuator having a release mechanism and a buffer structure for explanation, but not limited to this. The actuator having a release mechanism and a buffer structure mainly comprises a housing 10, an electric motor 20, a rear base 25, a transmission mechanism 30, a release mechanism 40, and a buffer structure 50.

Figure 1:
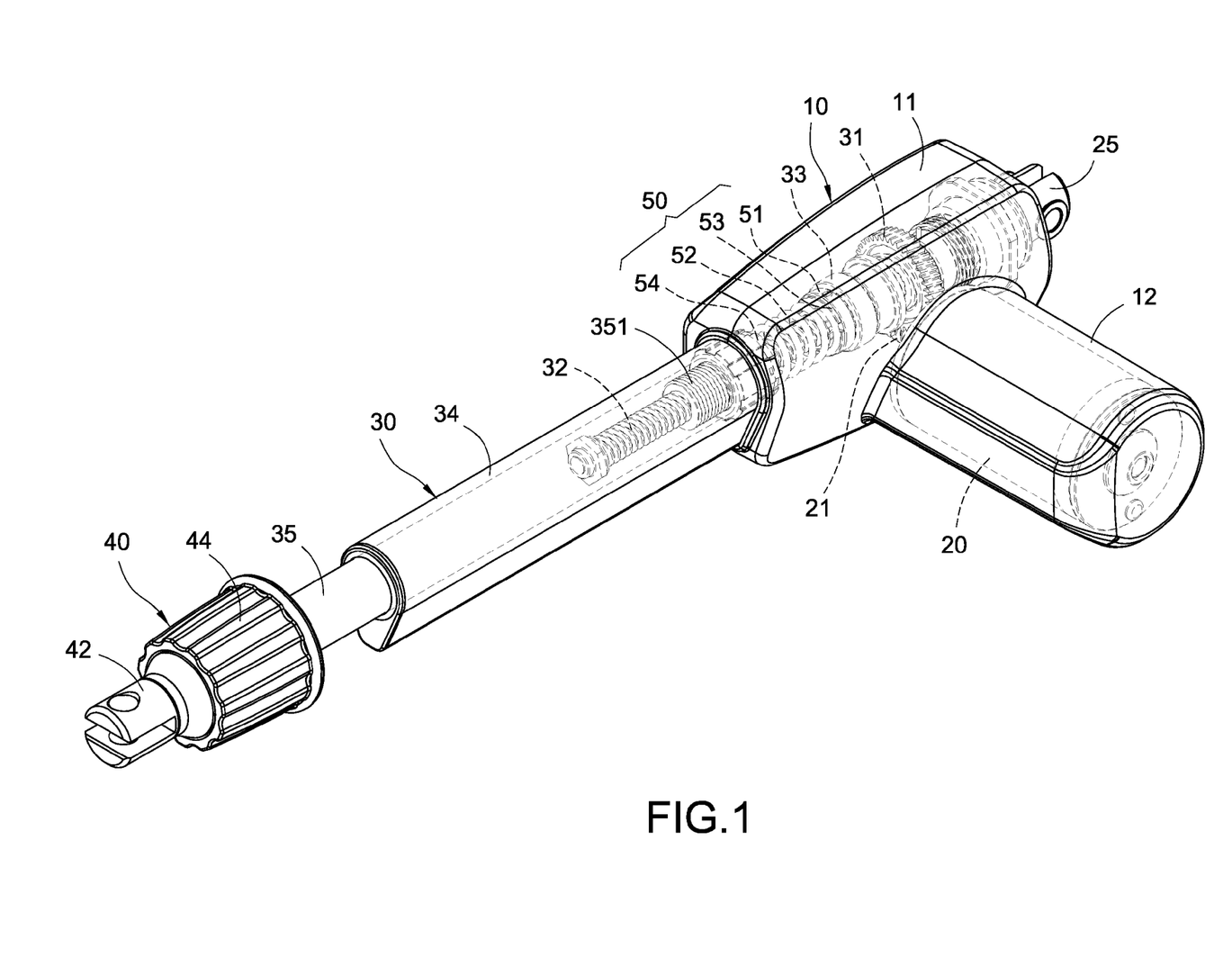
FIG. 1 is an assembled schematic view of the actuator according to the present invention.
Figure 2:
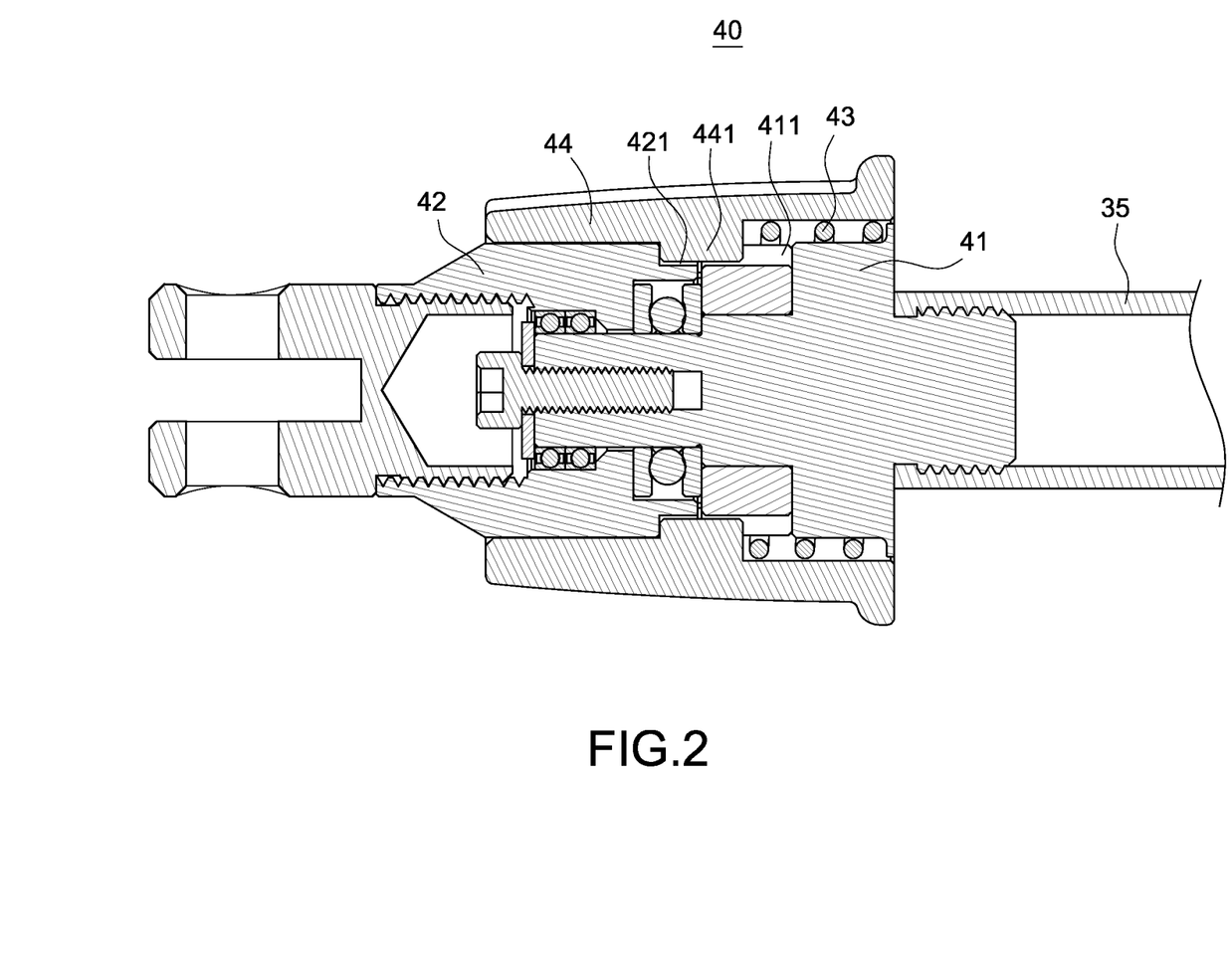
FIG. 2 is an assembled cross-sectional view of the release mechanism of the actuator according to the present invention.

The housing 10 comprises an upper shell 11 and a lower shell 12 correspondingly combined to the upper shell 11. A space is formed within the lower shell 12 to receive and fix the electric motor 20. The electric motor 20 has a worm shaft 21. The rear base 25 is disposed substantially perpendicular to the axis line of the electric motor 20 and clamped at the parting position of the upper shell 11 and the lower shell 12.

The transmission mechanism 30 comprises a worm gear 31, a drive screw 32, and a bearing 33. The worm gear 31 and the bearing 33 are sleeved around the rear side of the drive screw 32. The bearing 22 is disposed within the upper shell 11 and the lower shell 12 to support the worm gear 31 and the drive screw 32. One end of the drive screw 32 extends out of the upper shell 11 and the lower shell 12.

The transmission mechanism 30 further comprises an external tube 34 and a stretchable tube 35. The external tube 34 is sleeved around and along the perimeter of the drive screw 32 and one end of the external tube 34 is inserted firmly into the upper shell 11 and the lower shell 12. A nut 351 is connected firmly to one end of the stretchable tube 35 which is passed through and connected to the external tube 34 and is screwed to the drive screw 32 using the nut 351 such that the stretchable tube 35 and the nut 351 can only move linearly and axially with respect to the external tube 34 and the drive screw 32. The drive screw 32 is a non self-locking drive screw; that is, when the drive screw 32 is restricted and can not rotate, the nut 351 experiencing the effect of an axial pushing force or compression force will make the nut 351 and the stretchable tube 35 rotate freely with respect to the drive screw 32.

Please also refer to FIG. 2. The release mechanism 40 comprises an end shaft 41, a front base 42, a helical spring 43, and a release handwheel 44. The end shaft 41 is screwed firmly to an end of the stretchable tube 35 away from the nut 351. The front base 42 is sleeved around and connected to an end of the end shaft 41 and selectively rotates with respect to the end shaft 41. A plurality of first keyways 411 and a plurality of second keyways 421 are disposed on the end shaft 41 and the corresponding end of the front base 42, respectively. The release handwheel 44 is sleeved around and connected at the joint of the end shaft 41 and the front base 42. Also, a plurality of raised keys 441 extend within the release handwheel 44 to correspondingly be engaged with and removed away from the first keyways 411 and the second keyways 421. Two ends of the helical spring 43 are pushed flexibly between the end shaft 41 and the release handwheel 44. Using the spring force of the helical spring 43, in a normal state, the release handwheel 44 with the raised keys 441 engaged with the first keyways 411 and the second keyways 421 makes the end shaft 41 and the front base 42 move axially. When the release handwheel 44 is pushed toward the end shaft 41, the end shaft 41 and the front base 42 lift the restriction of the raised keys 441. At this moment, the front base 42 remains still and the end shaft 41 follows the stretchable tube 35 to rotate.

The buffer structure 50 comprises a positioning member 51 and a buffer unit 52. The positioning member 51 comprises a positioning ring 511 and a pin 512. The drive screw 32 has a through hole 321 disposed near the front side of the bearing 33. The positioning ring 511 has a connecting hole 513. The positioning ring 511 is screwed to the drive screw 32 and is fixed to the drive screw 32 using the pin 512 forcibly inserted into the connecting hole 513 and the through hole 321. The buffer unit 52 is sleeved around and disposed coaxially with the drive screw 32 and disposed between the nut 341 and the positioning member 51. Besides, the buffer unit 52 in the embodiment can be a compressed helical spring.

Figure 3:
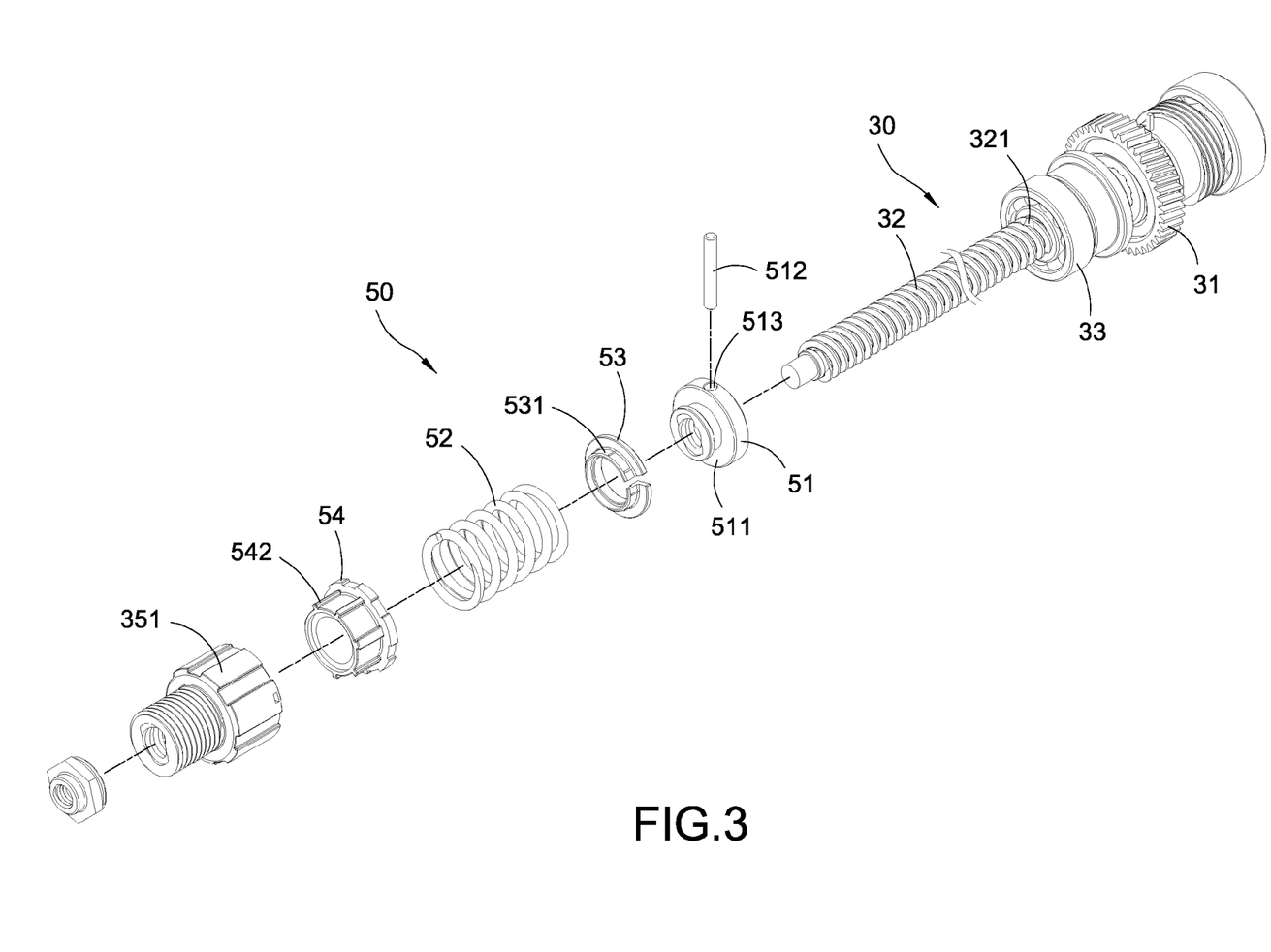
FIG. 3 is an explosive perspective view of some components of the actuator according to the present invention.
Figure 4:
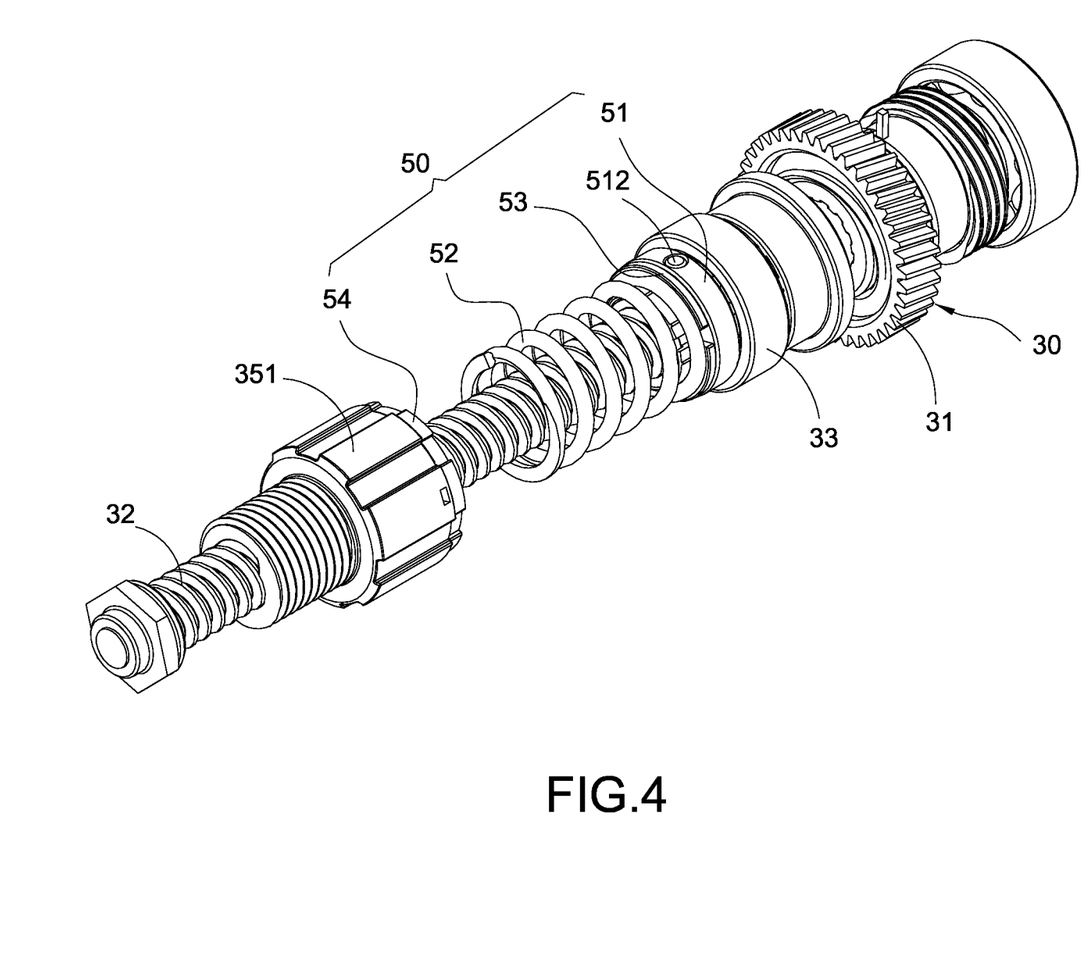
FIG. 4 is an assembled perspective view of the components in FIG. 3.
Figure 5:
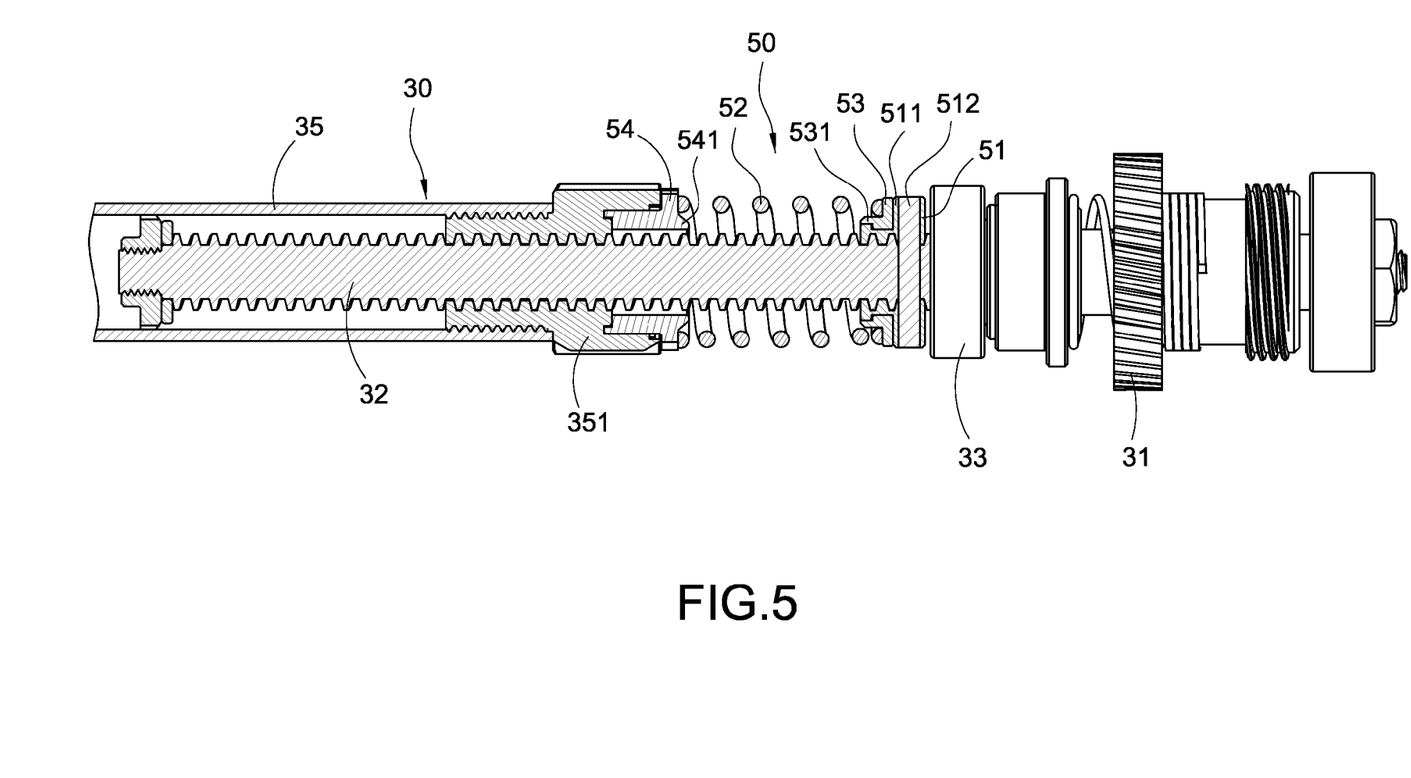
FIG. 5 is a partially cross-sectional view of the components in FIG. 4 combined with the stretchable tube.

Please also refer to FIG. 3. The buffer structure 50 of the present invention further comprises a rear connecting ring 53 between the buffer unit 52 and the positioning ring 511, and a front connecting ring 54 between the buffer unit 52 and the nut 351. One end portion of the rear connecting ring 53 extends to form a real coupling portion 531 for sleeving around and fixing one end of the buffer unit 52. One end portion of the front connecting ring 54 extends to form a front coupling portion 541 (shown as FIG. 5) for sleeving around and fixing another end of the buffer unit 52. The front connecting ring 54 extends toward the nut 351 to form a plurality of raised ribs 542 for engaging with and connecting to the nut 351 as a whole.

Also, the buffer structure 50 can merely be the above-mentioned buffer unit 52. The buffer unit 52 is sleeved around the perimeter of the drive screw 32 and disposed on the side of the drive screw 32 along which the nut 351 moves; thus, the impact force generated during the fast falling of the nut 351 and the stretchable tube 35 can be absorbed by means of the spring force of the buffer unit 52.

Figure 6:
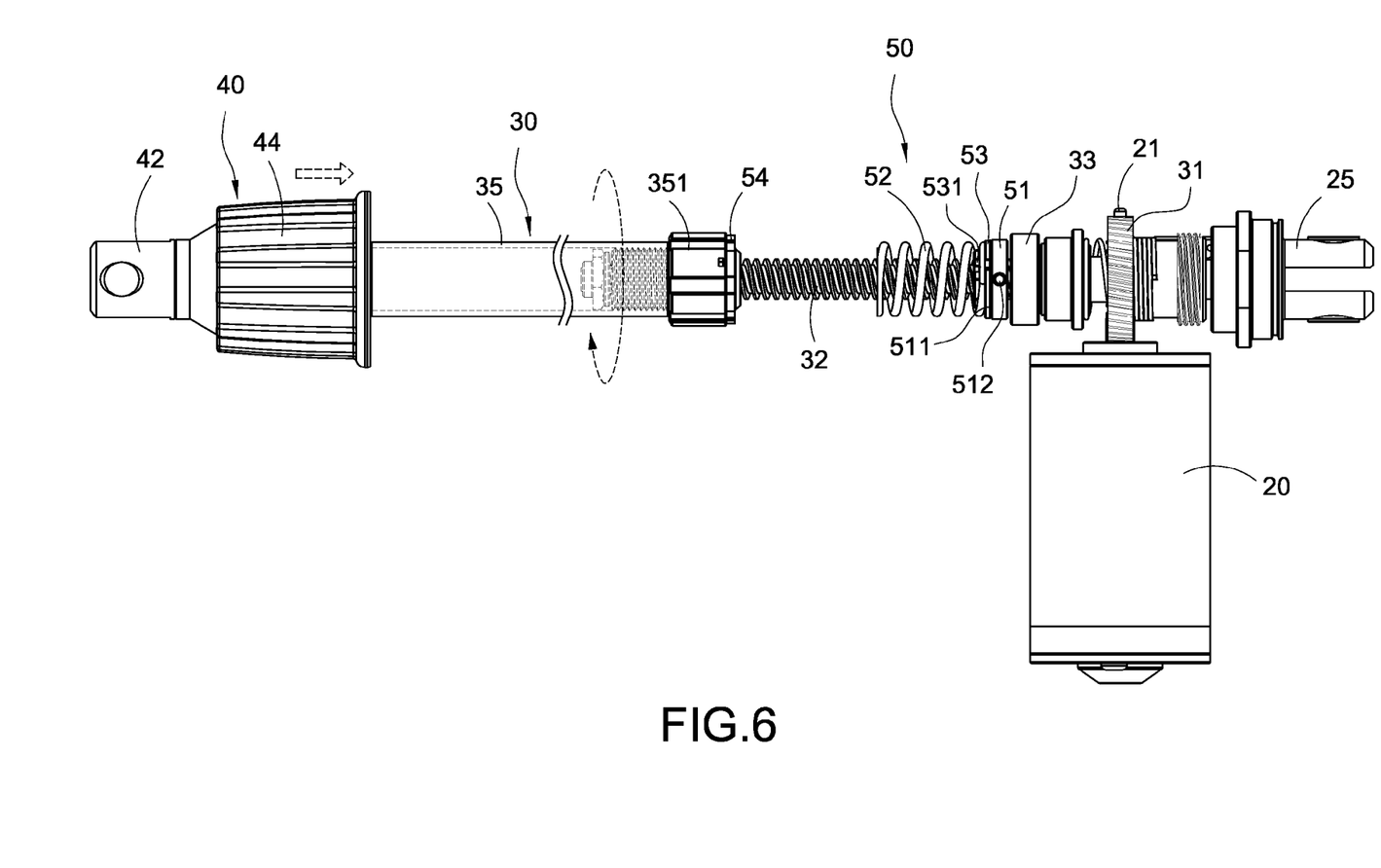
FIG. 6 is an operation status of the actuator according to the present invention.
Figure 7:
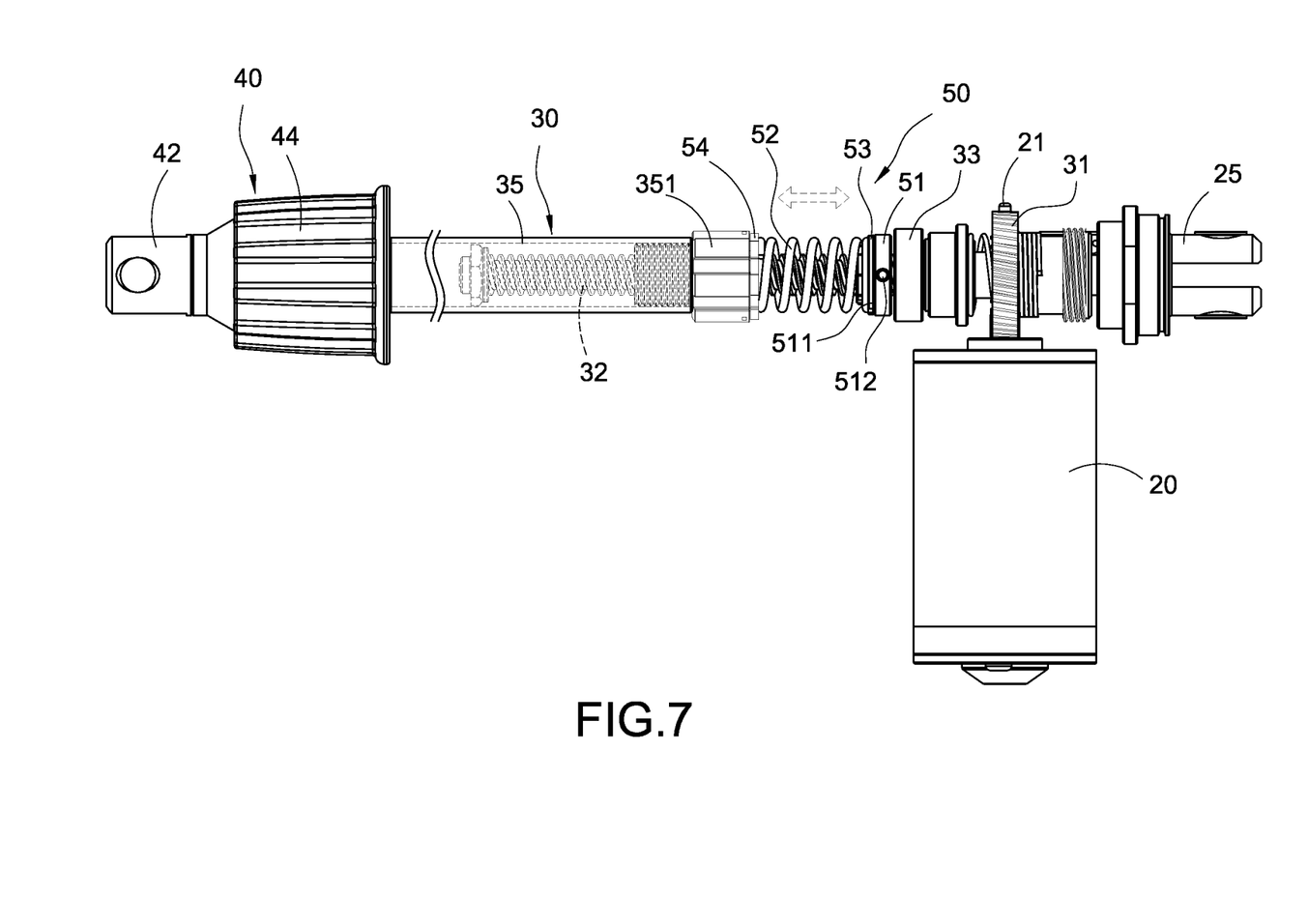
FIG. 7 is another operation status of the actuator according to the present invention.

Please also refer to FIGS. 2, 6, and 7. In operation, the release handwheel 44 is pushed axially toward the stretchable tube 35 and released; thus, the raised keys 441 are moved out from the second keyways 421 and received within the first keyways 411. Due to the front base 42 being fixed to the hospital bed (not shown) using the pin, the front base 42 cannot be rotated. Also, the drive screw 32 cannot be rotated due to the engagement between the worm shaft 21 and the worm gear 31 of the electric motor 20. However, the end shaft 41 is fixed to one end of the stretchable tube 35. When the stretchable tube 35 rotates and moves with respect to the front base 42 via the nut 351, the end shaft 41 will follow the stretchable tube 35 to rotate with respect to the front base 42. When both of the stretchable tube 35 and the nut 351 move fast and axially along the drive screw 32, the nut 351 will directly push against and compress the buffer unit 52 during its moving downward. Using the spring force and restoring force of the buffer unit 52, the impact force generated during the fast falling of the nut 351 and the stretchable tube 35 is absorbed.

In summary, the actuator having the buffer structure of the present invention indeed achieves the expected objective and overcomes the disadvantages of related art. Therefore, the present invention is useful, novel and non-obvious. Please examine the application carefully and grant it a patent for protecting the rights of the inventor

What is claimed is:

1. An actuator having a buffer structure, comprising:
   a drive screw (32);
   an external tube (34) sleeved around the drive screw (32) externally;
   a stretchable tube (35) passing through and connected to the external tube (34), wherein the stretchable tube (35) has a nut (351) screwed to and driven by the drive screw (32), wherein an outer surface of one end of the nut (351) is formed with a thread, and an outer surface of another end of the nut (351) is formed with a plurality of protrusion strips; the nut (351) is screwed to an inner surface of the stretchable tube (35) by the thread, and the protrusion strips are exposed outside of the stretchable tube (35);
   a buffer structure (50) comprising:
      a positioning member (51) fixed to the drive screw (32); and
      a compressed helical spring (52) sleeved around the drive screw (32) and between the nut (351) and the positioning member (51); and
   a release mechanism (40) including an end shaft (41), a front base (42), a helical spring (43), and a release handwheel (44), wherein the end shaft (41) connects to an end of the stretchable tube (35) away from the nut (351), wherein the front base (42) is sleeved around and connected to an end of the end shaft (41), wherein the release handwheel (44) is sleeved around and connected at the joint of the end shaft (41) and the front base (42), wherein the helical spring (43) is disposed between the release handwheel (44) and sleeved on the end shaft (41), and the helical spring (43) extends or is compressed along an axial direction of the end shaft (41) and the release handwheel (44), whereby the end shaft (41) can selectively rotate with respect to the front base (42) via the release handwheel (44).

2. The actuator having the buffer structure according to claim 1, wherein a plurality of first keyways (411) and a plurality of second keyways (421) are disposed on the corresponding end of the end shaft (41) and the corresponding end of the front base (42), respectively, wherein a plurality of raised keys (441) extend within the release handwheel (44) to correspondingly be engaged with and removed away from the first keyways (411) and the second keyways (421).

3. The actuator having the buffer structure according to claim 1, further comprising a housing (10) and an electric motor (20), wherein the electric motor (20) is received and fixed within the housing (10), wherein an end of the drive screw (32) is received within the housing (10) and driven by the electric motor (20), wherein an end of the external tube (34) is inserted connected to the housing (10).

4. The actuator having the buffer structure according to claim 3, wherein the compressed helical spring which is disposed coaxially with the drive screw (32).

5. The actuator having the buffer structure according to claim 1, wherein the positioning member (51) comprises a positioning ring (511) and a pin (512), wherein the drive screw (32) has a through hole (321) and the positioning ring (511) has a connecting hole (513), wherein the positioning ring (511) is screwed to the drive screw (32) and is fixed to the drive screw (32) using the pin (512) forced into the connecting hole (513) and the through hole (321).

6. The actuator having the buffer structure according to claim 5, wherein the buffer structure (50) further comprises a rear connecting ring (53) between the buffer unit (52) and the positioning ring (511), wherein an end portion of the rear connecting ring (53) extends to form a real coupling portion (531) for sleeving around and fixing the buffer unit (52).

7. The actuator having the buffer structure according to claim 6, wherein the buffer structure (50) further comprises a front connecting ring (54) between the buffer unit (52) and the nut (351), wherein an end portion of the front connecting ring (54) extends to form a front coupling portion (541) for sleeving around and fixing the buffer unit (52).

8. The actuator having the buffer structure according to claim 7, wherein the front connecting ring (54) extends toward the nut (351) to form a plurality of raised ribs (542) for engaging with and connecting to the nut (351).

9. The actuator having the buffer structure according to claim 1, wherein the positioning member (51) comprises a positioning ring (511) and a pin (512), wherein the drive screw (32) has a through hole (321) and the positioning ring (511) has a connecting hole (513), wherein the positioning ring (511) is screwed to the drive screw (32) and is fixed to the drive screw (32) using the pin (512) forcibly inserted into the connecting hole (513) and the through hole (321).

10. The actuator having the buffer structure according to claim 9, wherein the buffer structure (50) further comprises a rear connecting ring (53) between the buffer unit (52) and the positioning ring (511), wherein an end portion of the rear connecting ring (53) extends to form a real coupling portion (531) for sleeving around and fixing the buffer unit (52).

11. The actuator having the buffer structure according to claim 10, wherein the buffer structure (50) further comprises a front connecting ring (54) between the buffer unit (52) and the nut (351), wherein an end portion of the front connecting ring (54) extends to form a front coupling portion (541) for sleeving around and fixing the buffer unit (52).

12. The actuator having the buffer structure according to claim 11, wherein the front connecting ring (54) extends toward the nut (351) to form a plurality of raised ribs (542) for engaging with and connecting to the nut (351).

13. An actuator having a buffer structure, comprising:
a drive screw (32);
a stretchable tube (35);
a nut (351) screwed to the drive screw (32), wherein the nut (351) is confined to move axially with respect to the drive screw (32); an outer surface of one end of the nut (351) is formed with a thread, and an outer surface of another end of the nut (351) is formed with a plurality of protrusion strips; the nut (351) is screwed to an inner surface of the stretchable tube (35) by the thread, and the protrusion strips are exposed outside of the stretchable tube (35);
a buffer structure (50) comprising a compressed helical spring (52) sleeved around the perimeter of the drive screw (32) and disposed on a side of the drive screw (32) along where the nut (351) moves; and
a release mechanism (40) including an end shaft (41), a front base (42), a helical spring (43), and a release handwheel (44), wherein the end shaft (41) connects to an end of the stretchable tube (35) away from the nut (351), wherein the front base (42) is sleeved around and connected to an end of the end shaft (41), wherein the release handwheel (44) is sleeved around and connected at the joint of the end shaft (41) and the front base (42), wherein the helical spring (43) is disposed between the release handwheel (44) and sleeved on the end shaft (41), and the helical spring (43) extends or is compressed along an axial direction of the end shaft (41) and the release handwheel (44), whereby the end shaft (41) can selectively rotate with respect to the front base (42) via the release handwheel (44).

14. The actuator having the buffer structure according to claim 13, wherein a plurality of first keyways (411) and a plurality of second keyways (421) are disposed on the end shaft (41) and the corresponding end of the front base (42), respectively, wherein a plurality of raised keys (441) extend within the release handwheel (44) to correspondingly be engaged with and removed away from the first keyways (411) and the second keyways (421).

15. The actuator having the buffer structure according to claim 13, further comprising a housing (10) and an electric motor (20), wherein the electric motor (20) is received and fixed within the housing (10), wherein an end of the drive screw (32) is received within the housing (10) and driven by the electric motor (20).

16. The actuator having the buffer structure according to claim 15, wherein the compressed helical spring is disposed coaxially with the drive screw (32).

\* \* \* \* \*